United States Patent [19]

Sioufi

[11] 3,867,615

[45] Feb. 18, 1975

[54] APPARATUS FOR DETERMINING THE TOTAL DURATION OF TRANSITORY PHENOMENA

[76] Inventor: Amedee Sioufi, Rue de Damas, Beyrouth, Lebanon

[22] Filed: July 27, 1972

[21] Appl. No.: 275,861

Related U.S. Application Data

[63] Continuation-in-part of Ser. No. 845,188, July 28, 1969.

[52] U.S. Cl.......... 235/92 TC, 235/92 R, 235/92 T, 340/51
[51] Int. Cl............................................. G08g 1/065
[58] Field of Search.......... 235/92 TC, 92 T; 340/51

[56] References Cited
UNITED STATES PATENTS

| | | | |
|---|---|---|---|
| 2,906,505 | 9/1959 | Orr | 340/51 |
| 3,109,926 | 11/1963 | Bolton | 340/51 |
| 3,484,586 | 12/1969 | Wilson | 340/51 |

Primary Examiner—Harvey E. Springborn
Assistant Examiner—Robert F. Gnuse
Attorney, Agent, or Firm—Ernest G. Montague; Karl F. Ross; Herbert Dubno

[57] ABSTRACT

An apparatus for determining the parking time of vehicles in a car park, comprising a flat detecting device for supplying a signal when a vehicle enters the park, and a second detecting device for supplying a signal when a vehicle departs from the park. A timer to calibrate the signals from the first and second detecting devices in time and for attributing different algebraic signs to the calibrated times of the signals depending upon which of the detectors they come from, and a device for summing the calibrated times of the signals in an algebraic sum, for obtaining by the summing device information corresponding to the result of the operation $\Sigma\, Tsi - \Sigma\, Tei$, in which $Tsi$ and $Tei$ are, respectively, the departure times and the entry times of the vehicles, in an order to determine the total parking time of the vehicles in the park.

3 Claims, 7 Drawing Figures

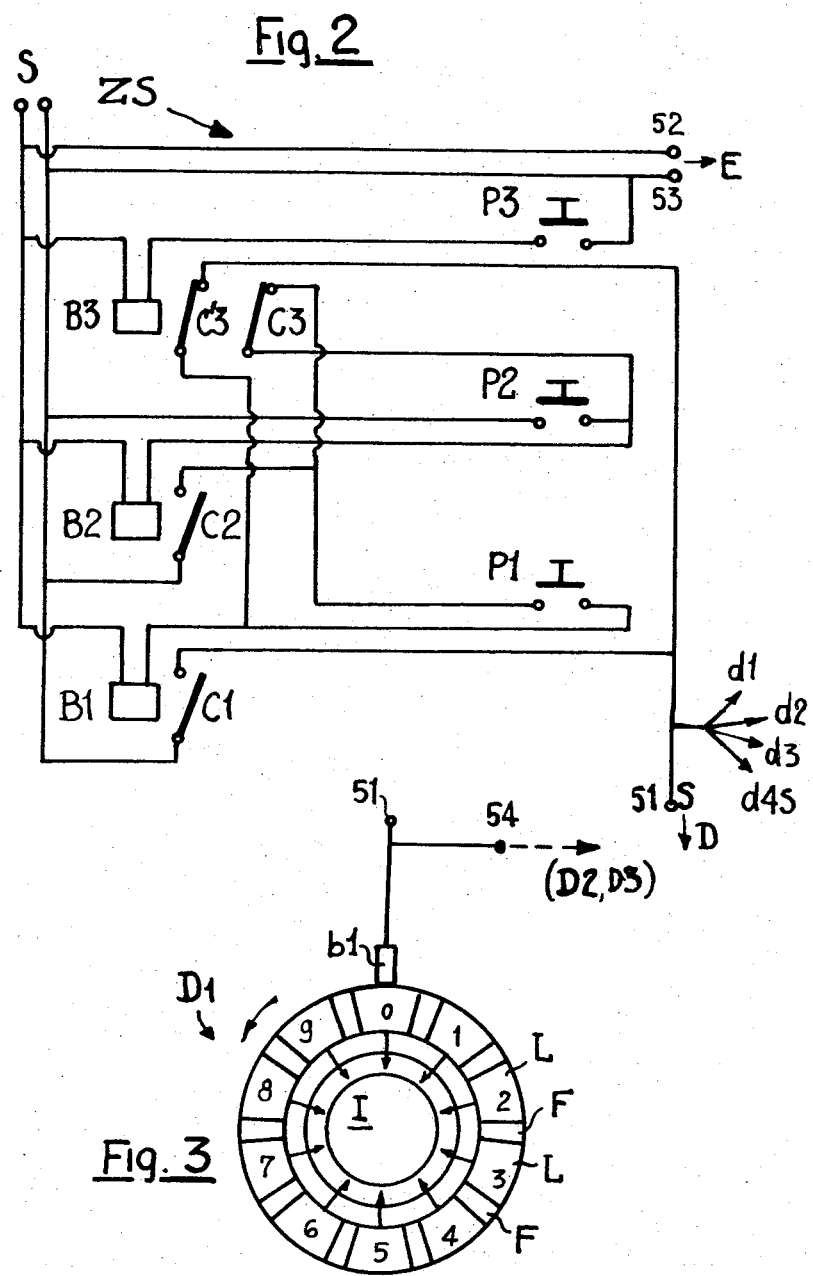

APPARATUS FOR DETERMINING THE TOTAL DURATION OF TRANSITORY PHENOMENA

CROSS-REFERENCE TO RELATED APPLICATIONS

This application is a continuation-in-part application of my co-pending application Ser. No. 845,188 filed July 28, 1969.

FIELD OF THE INVENTION

The present invention relates to apparatus for determining the duration of transitory phenomena. A particular application of the apparatus is the recording of the parking duration of vehicles in a car park, i.e. a parking area.

BACKGROUND OF THE INVENTION

In general, in order to determine the total duration of a number of events, each of which has a definite beginning and a definite end, the duration of each event is calculated and the separate durations thus obtained are added together to obtain the total duration.

For example, in order to determine the total parking time of vehicles in a car park during a given time interval, the lengths of the parking times of each vehicle during the time interval are determined and all such times are added together to obtain the total parking time of all the vehicles.

However, in some cases the beginnings of the different events are indicated by indentical signals (for example, audible, light or printed signals) and the ends of the events are indicated by other identical signals, each at its appropriate time, so that it is impossible to discriminate between the signal for the end of an event and the signal for the beginning of the same event.

Let us assume, for example, that the successive entries of vehicle into a car park are indicated by identical signals (e.g. the recording of the entry time on a drum or the lighting of a lamp in a panel), each at the approriate time, that is:

$Te1, Te2 \ldots Ten \ldots$ (the numbers in these times indicate the chronological order of entry and in no way serve to identify the vehicles, since there is no simple means for identification).

Let the successive departure times of the vehicles be indicated in the same manner by signals different from the entry signals, that is:

$Ts1, Ts2 \ldots Tsn \ldots$

It is, therefore, impossible to know which entry time corresponds to which departure time. In other words, a car which enters at the time $Te3$, for example, is not necessarily the car which departs at the time $Ts3$, since its exit time can be any one of the exit times after $Te3$.

Under these conditions, therefore, it is impossible to know the parking time of each vehicle separately.

OBJECTS OF THE INVENTION

The present invention has as an object to provide apparatus which can determine the total time of events occurring under such conditions.

In the example of vehicles parking in a car park, a knowledge of the total time can be used for supervising the operating staff, more particularly the person who collects fees for each car according to its parking time. The present invention aims also to provide a new apparatus which also can determine the individual time of parking of different vehicles in a car park.

SUMMARY OF THE INVENTION

One embodiment of the apparatus of the invention is based on the following formula:

$$\phi = \sum_{T1}^{T2} Tsi - \sum_{T1}^{T2} Tei + (T2 \cdot R2) - (T1 \cdot R1) \quad \text{(a)}$$

in which:

$\phi$ is the total duration of events occurring between times $T1$ and $T2$ (in the case of a car park, the sum of the parking times of all the vehicles between the times $T1$ and $T2$);

$$\sum_{T1}^{T2} Tei$$

is the sum of the times at which the different events begin (in the example, the sum of the entry times of vehicles to the car park in the interval from $T1$ to $T2$);

$$\sum_{T1}^{T2} Tsi$$

is the sum of the times at which the events end (in the example, the sum of the departure times of vehicles from the car park in the interval from $T1$ to $T2$):

$R2$ is the number of residual events which have not yet ended at time $T2$ (for example, the number of vehicles still parked after time $T2$): and $R1$ is the number of events which began before $T1$ and are still in progress at the time $T1$ (in the example, the number of vehicles which were parked before $T1$ and which remained parked after $T1$).

If $Ne$ and $Ns$ denote the respective numbers of beginnings and ends of the events in the interval from a time base (0) to a given time ($T$) (for example in a car park, the numbers of vehicles entering and departing respectively during the interval), we also have the following relationships:

$R1 = N1e - N1s$ (from 0 to $T1$)
$R2 = N2e - N2S$ (from 0 to $T2$)      (b)

Formula (a) together with relationships (b) thus gives the required total duration of a given number of events, the individual durations of which are unknown. In a car park, for example, it is possible to determine the total parking time for all the cars without knowing the individual parking times.

Accordingly an apparatus according to the invention for determining the toal duration of transitory events, includes detecting means for supplying different signals at the beginning and end of the events, timing means for calibrating the signals in time, and computing means for automatically summing the times allotted to the signals by the timing means in an algebraic sum in which different signs are attributed to the times, depending on whether they correspond to the beginning or end of the events.

BRIEF DESCRIPTION OF THE DRAWINGS

The above and other objects will become more readily apparent from the following detailed description, reference being made to the accompanying drawings, in which:

FIG. 3 is a diagram of a distributing means for the system of FIG. 1;

FIG. 7 is a schematic view of an alternative embodiment of the invention.

SPECIFIC DESCRIPTION

The apparatus illustrated in FIGS. 1 to 4 is designed to determine the total parking time of vehicles in a car park (PA, see FIG. 1) and comprises a detecting device ZS in the car park exit, which is actuated by vehicles passing out of the car park and which supplies signals to a timing device D which actuates a computing or recording device E.

Figure 2:
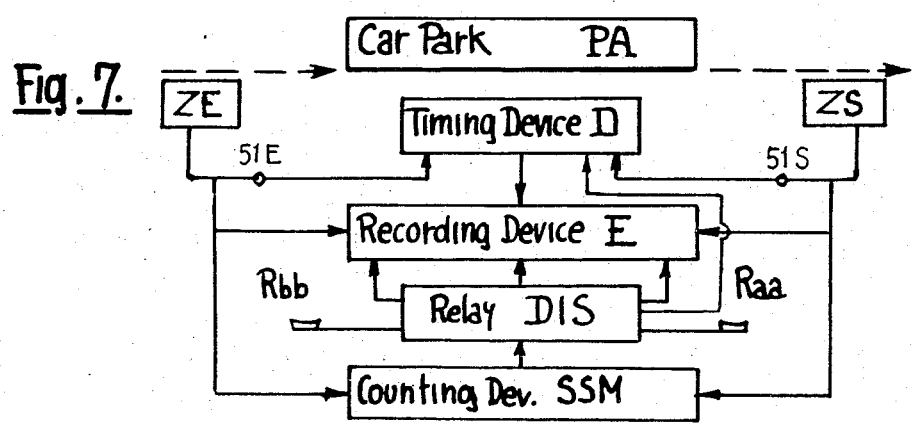
FIG. 2 is an electric circuit of a detector device for apparatus embodying the invention.

The detecting device ZS shown in FIG. 2 comprises an electric power supply S supplying three contact relay sets B1C1 and B2C2 and B3C3C'3 respectively, actuated by switches P1, P2 and P3. The switches, which are normally open, are temporarily closed by the weight of the wheels of a vehicle. Alternatively, the swithces can be operated remotely by devices actuated by photoelectric cells. The two contact sets B1C1 and B2C2 are normally open, whereas contact set B3C3C'3 is normally closed.

Switches P1 and P2 are placed close to one another in the path of vehicles passing through the exit, switch P1 being disposed in advance of switch P2. Switch P3 is disposed further behind at a suitable distance.

The detecting device operates as follows:

1. The front wheels of a vehicle pass over switch P1, which closes and then opens again. During the brief closure, switch P2 is open and contact C2 remains open, so that electromagnet B1 cannot be energized and nothing happens.

2. The front wheels of the vehicle then pass over switch P2 which closes and then re-opens. During this short closure, electromagnet B2 closes contact C2, which then maintains electromagnet B2 energized via contactor C3 when switch P2 opens and thus remains closed.

3. The back wheels of the vehicle pass over switch P1, which closes and then opens. During this brief closure, electromagnet B1 is energized via contact C2 (now closed) and thus closes contact C1 which maintains electromagnet B1 energized via contact C'3 when switch P1 opens. Terminal 51S is thus connected to the power supply.

4. The back wheels then pass over switch P2 which closes and opens again. Nothing further happens during this brief closure period, and terminal 51S remains energized.

5. The front wheels pass over switch P3, which closes and opens. During this brief closure, electromagnet B3 is energized to open contacts C3 and C'3, which interrupt the power supply to electromagnets B2 and B1 and open contacts C2 and C1. After switch P3 opens, contacts C3 and C'3 close again but, since contacts C2 and C1 are now open, electromagnets B2 and B1 can no longer be energized through contacts C3 and C'3. Terminal 51S is consequently disconnected form the power supply.

When, therefore, a vehicle passes over switches P1 and P2, terminal 51S is energized, whereas when the vehicle passes over switch P3, terminal 51S is disconnected.

Consequently, terminal 51S of detecting device ZS transmits an electric pulse to subsequent circuitry when a vehicle leaves the park. The duration of the pulse is variable, depending on the distance between P2 and P3 and the speed of the vehicle. It can be given a suitable value for actuating the subsequent circuitry.

A timing device D which receives the signal transmitted by terminal 51S comprises a number of identical distributing means D1, D2, D3..., which note the time of each signal (from an arbitrarily chosen time base), convert the time into a symbol and transmit it to a recording Device E.

Distributing means D1 is the only one shown in detail, distributing means D2, D3..., being identical with means D1, and indicated diagrammatically only. Distributing means D1 (FIGS. 3 and 4) comprises a drum I of insulating material driven at a constant speed by a motor M so that the drum makes a complete revolution in ten time units (e.g. 10 minutes or 10 × 5 minutes). Drum I is rigidly secured to a ring made of copper strips L separated by insultating members F, like a collector. A brush $bl$ engages the ring. The 10 copper strips L, which are numbered 0 to 9, are each connected to a respective copper ring $t$ disposed around drum I, the different rings $t$ being insulated from one another. Each ring $t$ is in contact with a collector brush $e$, and the different brushes $e$, which are insulated electrically from one another, are connected to respective output wires $f0, f1, f2 \ldots f9$.

Each strip L is thus electrically connected to a correspondingly numbered wire $f$.

The distributing means D1 operates in the following manner: As soon as a signal (indicating a passing vehicle) appears and terminal 51S is energized, the supply voltage is transmitted by brush $bl$ to the strip L with which it is in contact at that moment, and which transmits the voltage to the corresponding output wire $f$. If, for example, the time base is chosen at the instant where the strip L numbered 0 is in contact with brush $bl$, and if after some time a signal is emitted when, for example, strip L3 is in contact with brush $bl$, the result is that the emission time of the signal is symbolically indicated by a pulse in wire $f3$, since ring F makes one revolution per 10 time units, and when strip L3 arrives at brush $bl$, three time units have passed.

Distributor menas D2 is coupled to distributor means D1 annd is driven by distributor means D1 at one-tenth of the speed of D1. D3 is similarly driven by D2 at one-tenth the speed of D2.

Brushes $b2$ and $b3$ of distributor means D2 and D3 are supplied with voltage from a terminal 54, at the same time as brush $b1$ of means D1 is supplied from terminal 51S.

Distributor means D1 thus marks the units; distributor means D2 the tens, and distributor means D3 the hundreds of time units, and so on. In practice, one can stop at distributor means D3 or D4.

The wires $f$ of the timing device transmit the voltage to the recording device E which in turn comprises a number of identical recording units E1, E2, E3..., respectively, associated with distributor means D1, D2, D3, ....

Device E is a conventional adding machine, in which the units keyboard forms part of E1, the tens keyboard, part of E2, and the hundreds keyboard, part of E3, and so on. The keys in the different keyboards are individually actuated by electromagnets N0, N1, N2, etc., which are energized via relays K when the corresponding wire $f$ is energized. When, for example, strip L3 of distributor means D1 is under brush $b1$, wire $f3$ of distributor D1 is energized, if terminal 51 is supplied at this moment, and key T3 of the units keyboard is actuated. Three units are consequently introduced into the adding machine E. If strip L3 is under the brush after having made one or more complete revolutions, distributor means D2, D3, etc., simultaneously introduce the corresponding tens and hundreds into the adding machine.

As already stated, when a vehicle departs from the car park, the voltage appears at terminal 51S and the timing device transmits a number corresponding to the actual time $Tsi$ via the wires $f$. If a vehicle leaves, the device E is placed in the position of addition, due to the fact that an electromagnet N10 is energized via terminal $d4s$ (FIGS. 1 and 4) and actuates a (+) key of the adding machine. Each time a vehicle goes out, therefore, the actual time $T$ $si$ is added to the sum of times corresponding to the passing of preceding vehicles; we thus have $\Sigma T$ $si$ maintained each time a vehicle passes.

The entrance to the car park also has a detecting device ZE also coupled to the timing device D, but the signals transmitted by the latter timing device to the recording computer device E is accompanied by a signal transmitted to an electromagnet N 11 energized via a terminal $d4e$(FIGS. 1 and 4) and actuating a (−) key of the machine, thus putting the machine in the position for subtraction.

The computer thus automatically shows the result of the operation $\Sigma Tsi - \Sigma Tei$.

In order to complete the calculation of formula (a) using relationships (b), two counters CS and CE of passing vehicles actuated by terminals 51S and 51E of the detecting devices. Counter CE for entries and counter CS for departures, give the values of $Ne$ and $Ns$ for corresponding times, and transmit the corresponding information to the computer E via an auxiliary adding machine $Ea$ and a motorized relay $Rm$ to have the correction terms T2.R2 and/or T1.R1 of formula (a) and (b) introduced.

The embodiment shown can operate so that the origin of the time is assumed to start when the parking is empty (no vehicle inside). Then $R1 = o$ and $T1 = o$ and formula (a) is simplifyed and become:

$$\phi = \sum_{0}^{T2} Tsi - \sum_{0}^{T2} Tei + (T2 \cdot R2) \qquad (a')$$

In order to complete the calculation of said last formula ($a'$) using relationship (b), the above-mentioned two counter CE and CS of passing vehicles give the values of $N2e$ and $N2s$ for any time T2.

The auxiliary adding machine $Ea$ (FIG. 1) gives $R2 = N2e - N2s$, and when a button $Ra$ of the motorized relay $Rm$ is actuated by an operator the actual time T2 given by the timing device D already described is introduced in the computer E for a number of times equal to R2. Thus the term (T2.R2 is introduced in the computer which indicates the value "$\phi$" of formula ($a'$) which is the total sum of the parking times of all the vehicles between initial time $T1 = o$, when the parking was empty, and final time T2, when button $Ra$ has been actuated.

To be able to also work according to the general formula (a) which includes an additional term (Ti·Ri) which must be substracted, the motorized relay $Rm$ comprises a second button $Rb$ which permits intoducing in the machine when actuated at time T1, the product T1·R1. When the button $Rb$ is actuated, also the electromagnet N11 of machine E is energized actuating the key (−) of the machine, so that this product is substracted from the total already registered in E. Thus the new total "$\phi$" indicated in machine E is really the sum of the parking times of all the vehicles between times T1 and T2, when buttons $Ra$ and $Rb$ were respectively actuated.

Figure 1:
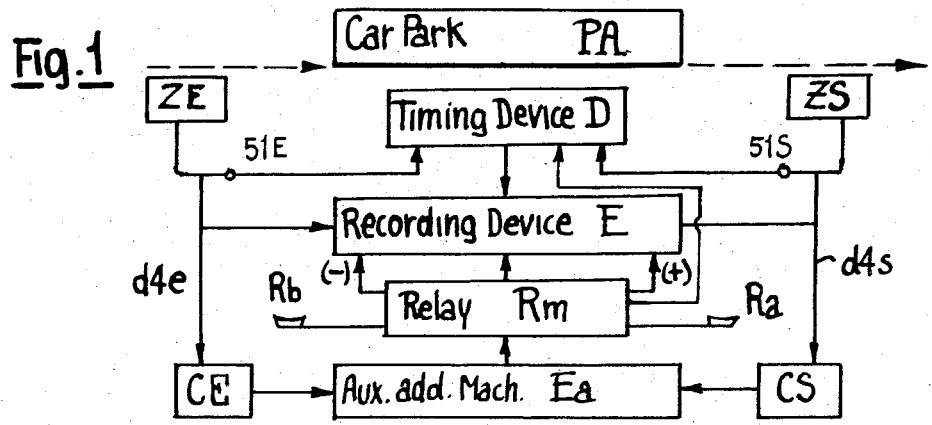
FIG. 1 is a block diagram of a first embodiment of the invention.

The motorized relay $Rm$ comprises a step by step motor which rotates for a number of steps equal to the numbers R2 or R1 given by the auxiliary adding machine $Ed$ when the buttons $Ra$ or $Rb$ are actuated (FIG. 1). For each step of the motor a signal is transmitted to the entrance terminal 51S of the timing device D (FIG. 3), thus introducing the actual time in the recording computer device E for a number of times equal to R2 or R1 (as already described in relation with the functioning of the timing device D and recording device E).

Thus the motorized relay $Rm$ transmits automatically to the machine E, the actual time furnished by the timing device D when button $Ra$ or $Rb$ are activated, at a number of times corresponding to R.

It should be noted that different connections $d1$, $d2$, $d3$, ... to terminal 51S can serve various purposes as required. To give some examples: $d1$ can supply power for automatically opening and closing a gate or barrier at the entrance or exit to the car park; $d2$ can actuate a mechanism for printing the passage time T on tickets used for collecting money; $d3$ can actuate a counter showing the number of passing vehicles, with or without recording.

In an alternative embodiment illustrated in FIG. 7, the two counters CE and CS of passing vehicles and the auxiliary adding machine $Ea$ can be replaced by a counting device SSM comprising a step by step motor actuated in one direction as a pulse is given by the entrance detector ZE and in the other direction when a pulse comes from the exit detector ZS. Thus said step by step motor has a position always corresponding to $R = Ne - Ns$, R being the actual number of cars in the park. The counting device SSM controls relay means DIS which introduce in the recording device E a number corresponding to R when buttons $Rbb$ or $Raa$ are actuated by an operator.

The actuating of button $Raa$, which is made at a time T2, has also the effect of introducing said time T2 (given by timing device D already described) into the machine E and to activate via an electromagnet N12 a multiplication key (×) of said machine for introducing the term $T2 \cdot R2$, in which $R2 = N2e - N2s$.

The actuating of button Rbb, made at time T1 permits introducing in the machine, in the same manner, the term $T1 \cdot R1$ in which $R1 = N1e - N1s$. Button Rbb actuates also the substracting key (−) of the machine, so that this last term is substracted.

The units of devices D and E can be given, not as units of time, but as the amount of money to be collected, so that, if the cost of parking is proportional to the parking time, the machine E will give, not the total time $\phi$ by the aforementioned formula, but the total amount which should be in the cash box.

In the embodiments of the apparatus which has been described with reference to FIGS. 1 to 4, and with reference to FIG. 7, the recording device E shows the total parking time of vehicles between any two given times, without however showing the parking time of any particular vehicle, the entry and departure of which have been noted by an observer or identified by suitable additional detecting means.

Figure 5:
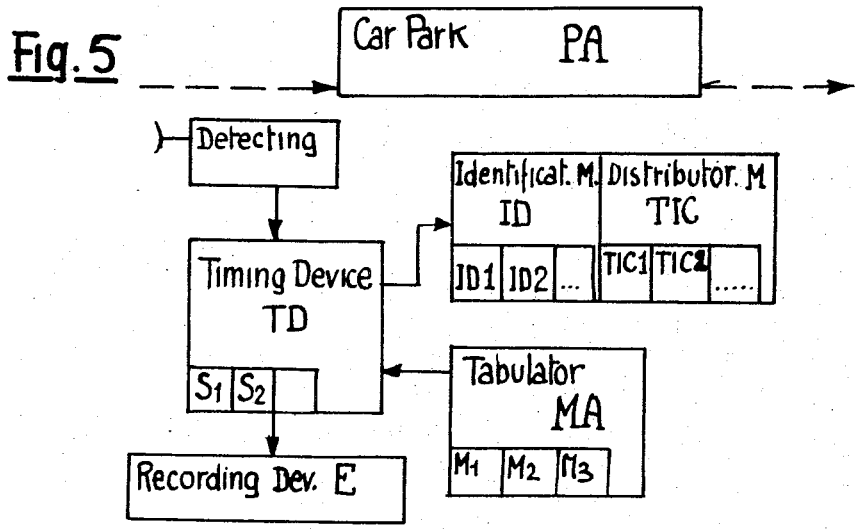
FIG. 5 is a schematic view of a second embodiment of the invention.
Figure 6:
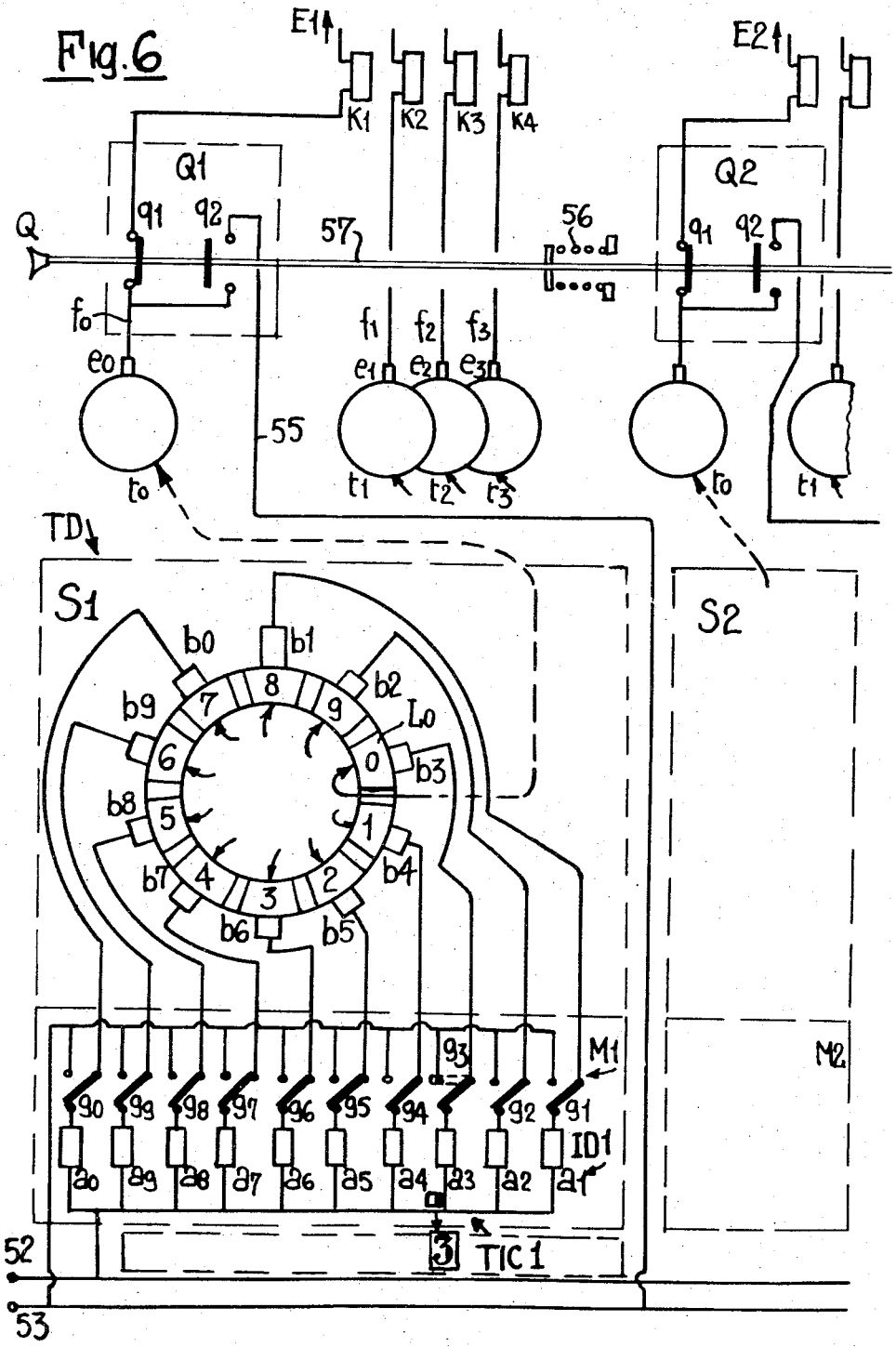
FIG. 6 illustrates an apparatus of the embodiment of the embodiment of FIG. 5.

In an embodiment illustrated diagrammatically in FIGS. 5 and 6, the apparatus is designed so as also to record the aforementioned individual times.

In this embodiment, the distribution means D1, D2, D3 . . . of the timing device D described above are modified and supplemented by additional circuits which are identical for the different distributors and which transform them into selectors S1, S2, S3 . . . comprised in the timing device TD of the embodiment.

Figure 4:
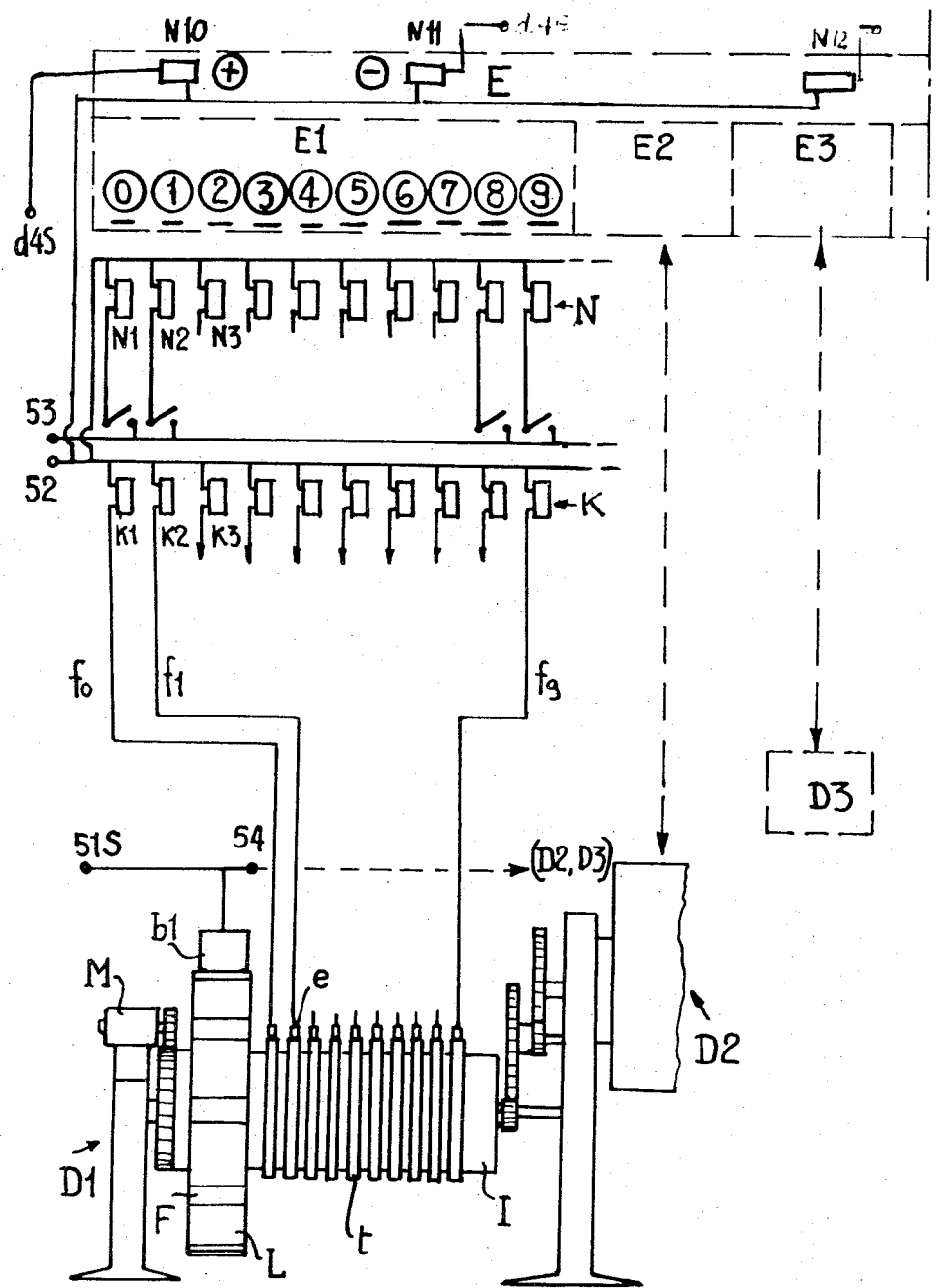
FIG. 4 is a diagram of a timing device comprising a number of distributing means similar to that of FIG. 3, for energizing a computing device which is also shown diagrammatically.

FIG. 6 shows the electric circuit of a selector S1 in the modified construction, which comprises a distributor such as D1 of the apparatus already described, modified and supplemented by additional circuits. The modified timing device TD also comprises selectors S2, S3 . . . which are diagrammatically indicated and designed in the same manner as selector S1. Selectors S2, S3 correspond to the distributors D2, D3 . . . of the first embodiment, and the unit or timing device TD formed by the selectors cooperates with a recording device E such as the one described earlier, which likewise comprises a number of identical recording devices E1, E3, E3 . . . coupled to selectors S1, S2, S3 . . . , respectively. Selector S1 comprises a drum of insulating material driven at constant speed by a motor so that the drum makes a complete revolution in ten time units. The drum as shown at FIG. 4, is rigidly secured to a ring made of copper strips L separated by insulating members, like a collector. The ten copper strips L, which are numbered 0 to 9 are each connected to a respective copper ring $t$ being insulated from one another. Each ring $t$ is in contact with a collector brush $e$ which are connected to output wires $f0$, $f1$, $f2$, etc. Each strip L is thus electrically connected to a correspondingly numbered wire $f$. The different selectors S1, S2, S3 . . . are coupled as previously described for the distributors D1, D2, D3 . . . .

In addition to brush $b1$, which is no longer connected to terminal 51S or 51E as before, selector S1 comprises a series of nine supplementary brushes $b0$, $b2$, $b3$, $b4$, $b5$, $b6$, $b7$, $b8$ and $b9$, regularly distributed around its rotating collector.

The 10 strips L0 to L9 and the 10 brushes $b0$ to $b9$ constitute respectively a first series of primary contact elements and a second series of secondary contact elements moving relatively as the time passes due to the rotation of the selector.

When a car enter the park, brush $b0$ receives an electrical signal as described hereafter and the secondary contact elements constituted by the brushes $b0$ to $b9$ are differently energized according to the actual angular position of the selector device when the signal occurs.

The 10 brushes $b0$ to $b9$ are individually connected to ten respective relays $a0$, $a1$ . . . $a9$ actuating an identification device ID1 of identification means ID comprising, for example a distributor device TIC1 of numbered tickets, comprised in distributor means TIC and to an electrical tabulator device M1 included in tabulator means MA and comprising 10 press-button two-way switches $g0$, $g1$ . . . $g9$.

A change-over switch Q1 (FIG. 6) in the output circuit $f0$ of selector S1 comprises a first switch $q1$ in the wire $f0$ connecting brush $e0$ to relay K1 of recording device E1 (FIGS. 3 and 4), and a second switch $q2$ (FIG. 4) which can connect the brush to a supply terminal 53 via a lead 55.

The other strips are connected to the corresponding rings $t$ and wires $f$ via brushes $e$, as in the apparatus already described.

Change-over switches Q2, Q3, identical with switch Q1 and corresponding to selectors S2, S3 . . . , respectively, are also provided. The different change-over switches are actuated by a common control rod 57 acted upon by spring 56 and bearing a push-button Q.

The two switches $q1$ and $q2$ of change-over switch Q1 are disposed on rod 57, so that one switch is closed when the other is open; spring 56 biases the change-over switch to a position in which relay K1 is in line and lead 55 is open-circuited. Change-over switches Q2, Q3, etc. are designed in the same manner.

In the embodiment shown in FIGS. 5 and 6, button Q acts as a detecting means for supplying an electrical signal when a vehicle enters the park. Button Q can be actuated manually by an operator, possibly by the driver of the vehicle. It can also be actuated by an automatic control means, e.g., when the vehicle passes.

When a vehicle enters the car park, button Q is actuated against the action of spring 56 to open switches $q1$ and close switches $q2$ with the result that strip L0 connected to ring $ro$ is energized from terminal 53 and the brush $b$ opposite strip L0 is consequently energized at the moment when contact $q2$ closes. The relay $a$ corresponding to the energized brush $b$ is then excited and actuates the ticket distributor device TIC, which prints and distributes a ticket bearing an identifying number or indice corresponding to the energized brush $b$. Numeral 3 is shown for relay $a3$ of the first decade given by selector S1, for the position shown at FIG. 6.

The apparatus shown at FIG. 6 is arranged so that this number which corresponds to the position of strip L0 at the entering of a vehicle allows to obtain the elapsed time when leaving, by energizing the same brush $b$, as described hereafter.

FIG. 6 shows selector S1 in an angular position in which brush $b3$ is energized and excites relay $a3$, whereas the other relays $a$ are not excited, since button Q is actuated for a moment only.

Relay $a3$ can, for example, print a numeral 3 on a ticket as mentioned above or open a compartmented case disposed at the entrance to the car park and containing tickets bearing the number 3, i.e., that of the relay.

Selectors S2, S3 . . . corresponding to distributors D2, D3 . . . in the embodiment already described, are designed in the same manner as means S1 already described, and the different change-over switches Q1, Q2, Q3 . . . are securely attached, so that the device actuated by the different relays $a$, excited at this moment, supplies a ticket or other record characterising the time at which button Q is actuated.

When the same vehicle leaves, an operator actuates the two-way switch $g$ corresponding to the number on the entry ticket of the vehicle given to him, or which has been stored by any suitable storage device.

In the system described, the two-way contact $g3$ of selector S1 is actuated and placed in the position shown by a dotted line in FIG. 6, thus energizing the corresponding brush $b3$ which then energizes the collector strip which at that moment is opposite the brush 1 as already described, and consequently energizes the corresponding relay K of the recording device E already described in reference to the apparatus shown by FIGS. 1 to 4. When actuated, the two-way contact $g3$ also insulates the corresponding relay $a3$.

Thus, the key board of the recording device E actuated by relays K records a number corresponding to the time which has elapsed between the entry and the departure of the vehicle.

The actuation of key Q assigns a sign or indicia corresponding to the entrance time of a vehicle, and stores the sign by tickets or in any other manner. When the same vehicle leaves, a knowledge of this sign enables an operator to operate switches $g$ corresponding to the same sign and thus communicate to the recording device E the time interval which has elapsed between the entry and departure of the vehicle, i.e. its parking time.

In other words, the actuation of tabulator M according to the tickets previously ovtained restores the state of energization of the secondary contact elements, the brushes $b$, in order to obtain at the primary contact elements, the strips L, by the fact of the relative displacement which occured in the meantime, a state of energization depending of the time elapsed between entrance and leaving of the vehicle, and permitting the determination of this time.

The recording device E adds all these parking times after having recorded them individually, thus also recording the total parking time of all the vehicles. In the example described, relay $a$ control a device for distributing tickets recording an identifying number or indice. In other embodiments, the relays may be adapted and actuate other means for achieving the same purpose, e.g., a notice-board, a printing device or a magnetic or other storage means, which could at the right moment restore the identifying number or indice transmitted to the recording device when a vehicle left, after the two-way switches $g$ have been correspondingly actuated.

While I have disclosed three embodiments of the present invention, it is to be understood that those embodiments are given by example only and not in a limiting sense.

I claim:

1. An apparatus for determining the parking time of vehicles in a car park, comprising:
   a first detecting means for supplying a signal when a vehicle enters the park,
   a second detecting means for supplying a signal when a vehicle departs from the park,
   timing means for assigning said signals from said first and second detecting means in time and for attributing different algebraic signs to the assigned times of said signals depending upon which of said detecting means they come from,
   computing means for summing the assigned times of said signals in an algebraic sum, for obtaining by the computing means information corresponding to the result of the operation $\Sigma Tsi - \Sigma Tei$, in which T$si$ and T$ei$ are, respectively, the departure times and the entry times of the vehicles in order to determine the total parking time of the vehicles in the park, said apparatus being for determining the total time spent in the car park by cars in a time interval between an initial time and a final time, wherein the park is empty at the initial time and cars can remain in the park at the final time, counter means operatively responsive to said first and second detecting means for determining the number of cars still in the park at the final time, and
   a relay means for transmitting to said computing means at the final time a correction term equal to the product of said final time multiplied by the number of cars left in the park.

2. An apparatus for determining the parking time of vehicles in a car park, comprising:
   a first detecting means for supplying a signal when a vehicle enters the park,
   a second detecting means for supplying a signal when a vehicle departs from the park,
   timing means for assigning said signals from said first and second detecting means in time and jfor attributing different algebraic signs to the assigned times of said signals depending upon which of said detecting means they come from,
   computing means for summing the assigned times of said signals in an algebraic sum, for obtaining by the computing means information corresponding to the result of the operation $\Sigma Tsi - \Sigma Tei$, in which T$si$ and T$ei$ are, respectively, the departure times and the entry times of the vehicles in order to determine the total parking time of the vehicles in the park, said apparatus being for determining the total time spent in the car park by cars in a time interval between an initial time and a final time, wherein cars can already be in the park at the initial time and can remain in the park at the final time,
   counter means operatively responsive to said first and second detecting means for determining the number of cars in the park at the initial time and at the final time, respectively, and
   a relay means for transmitting to said computing means with different algebraic signs, two correction terms, one of said correction terms is equal to the product of said final time multiplied by the number of the cars left in the park, and the other of said correction terms is equal to the product of said initial time multiplied by the number of the cars already in the park.

3. An apparatus for determining the parking time of vehicles in a car park, comprising:
   timing means continuously operable to provide a time base;
   first detecting means connected to said timing means for generating a series of signals representing entry times T$ei$ upon each entry of a vehicle into said park;

second detecting means connected to said timing means for generating a series of signals representing exit times T$si$ upon each exit of a vehicle from said park;

counting means connected to said first and second detecting means for registering the number $R_1$ of vehicles parked in said park prior to a Time $T_1$ and the number $R_2$ of vehicles remaining parked at a later time $T_2$; and computing means responsive to said signals and connected to said counting means for algebraically combining the sum $$\sum_{T_1}^{T_2} Tei$$

of the entry times for all incoming vehicles, the sum $$\sum_{T_1}^{T_2} Tsi$$

of the exit times for all outgoing vehicles over the interval $T_1 - T_2$ and the registered numbers $R_1$ and $R_2$ in accordance with the relationship:

$$\Phi = \sum_{T_1}^{T_2} Tsi - \sum_{T_1}^{T_2} Tei + (T_2 \cdot R_2) - (T_1 \cdot R_1)$$

where $\Phi$ is the overall parking duration for vehicles in said car park over said interval.

* * * * *